W. G. WILSON.
MACHINE FOR MOVING AND DEPOSITING CONCRETE AND OTHER PLASTIC MATERIAL.
APPLICATION FILED JULY 1, 1911.
1,048,019.
Patented Dec. 24, 1912.
5 SHEETS—SHEET 1.
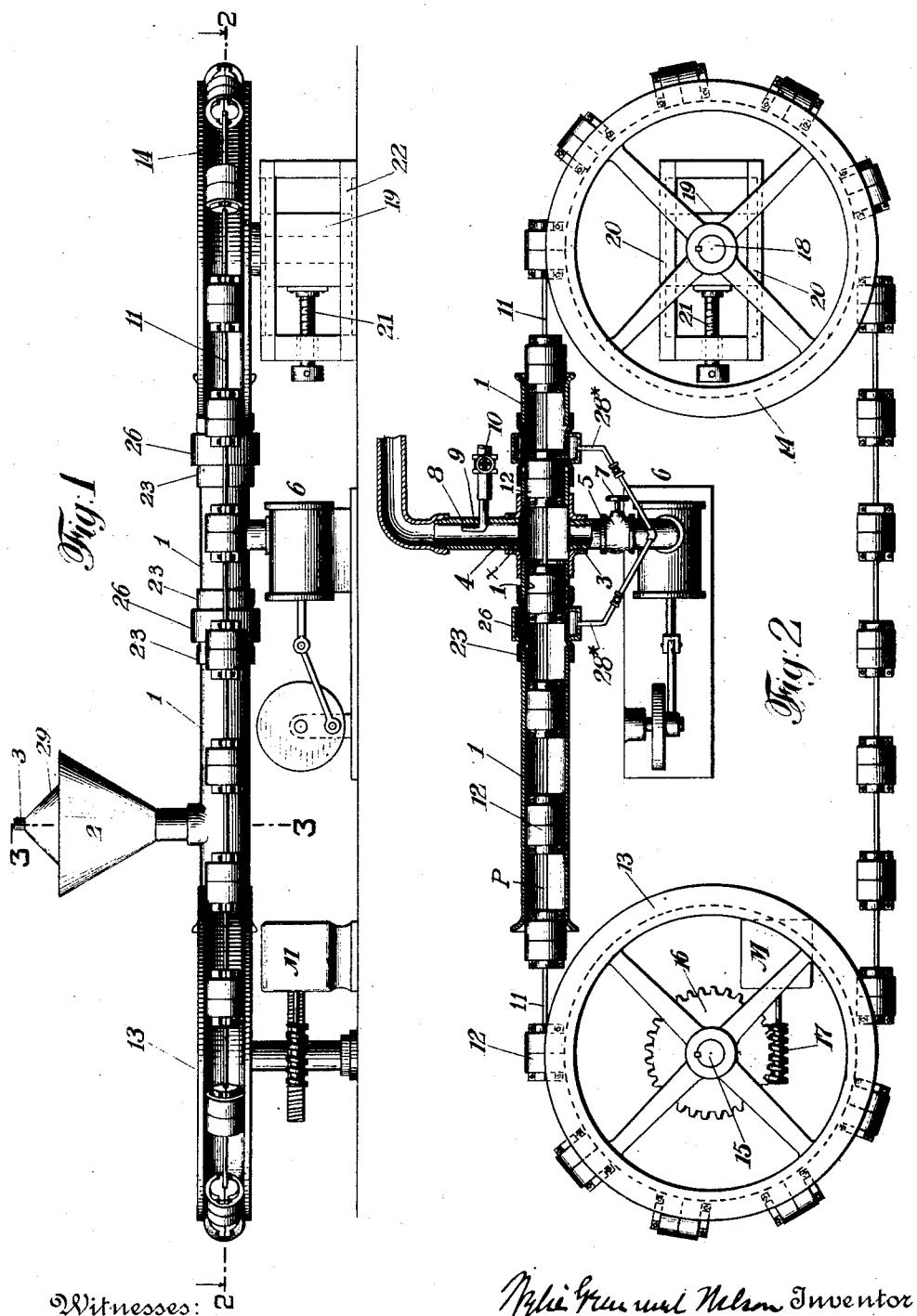

W. G. WILSON.
MACHINE FOR MOVING AND DEPOSITING CONCRETE AND OTHER PLASTIC MATERIAL.
APPLICATION FILED JULY 1, 1911.
1,048,019.
Patented Dec. 24, 1912.
5 SHEETS—SHEET 2.
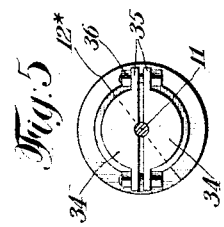
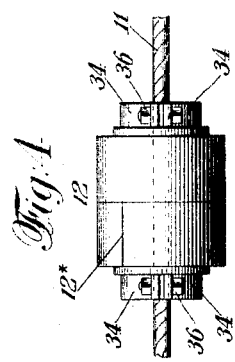
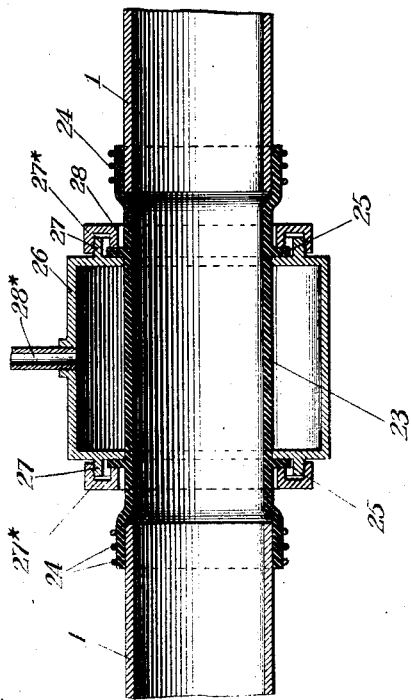
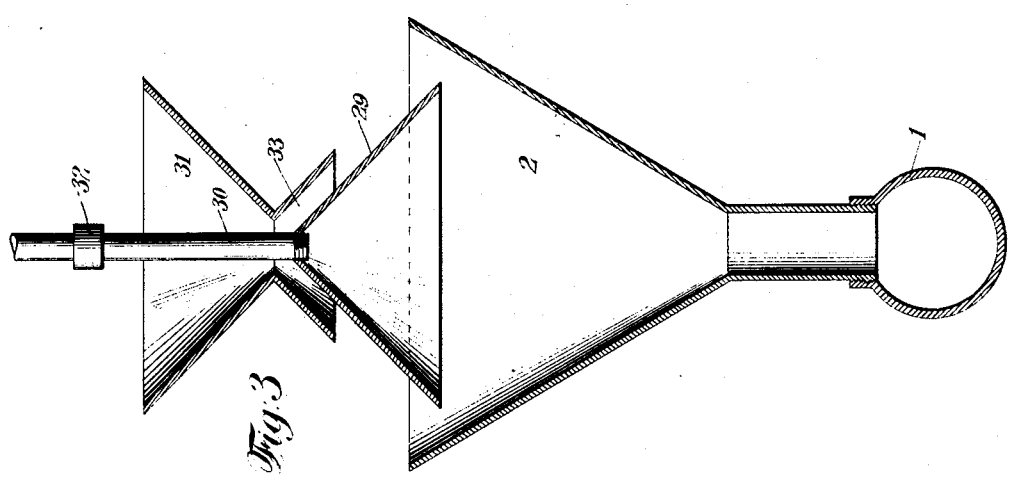

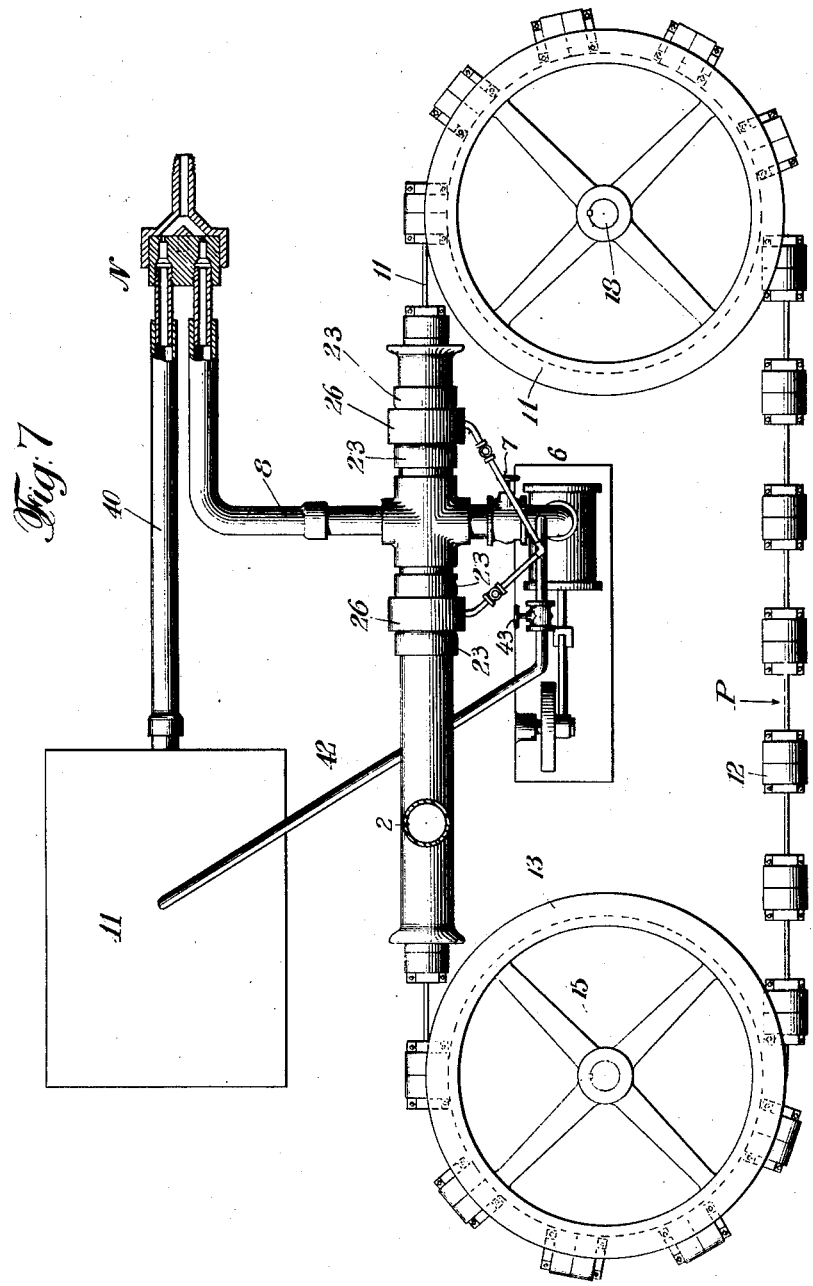

W. G. WILSON.
MACHINE FOR MOVING AND DEPOSITING CONCRETE AND OTHER PLASTIC MATERIAL.
APPLICATION FILED JULY 1, 1911.
1,048,019.
Patented Dec. 24, 1912.
5 SHEETS—SHEET 4.
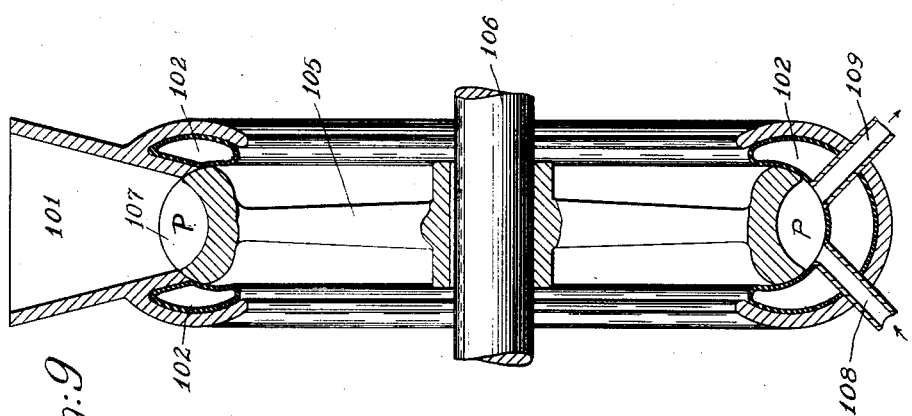
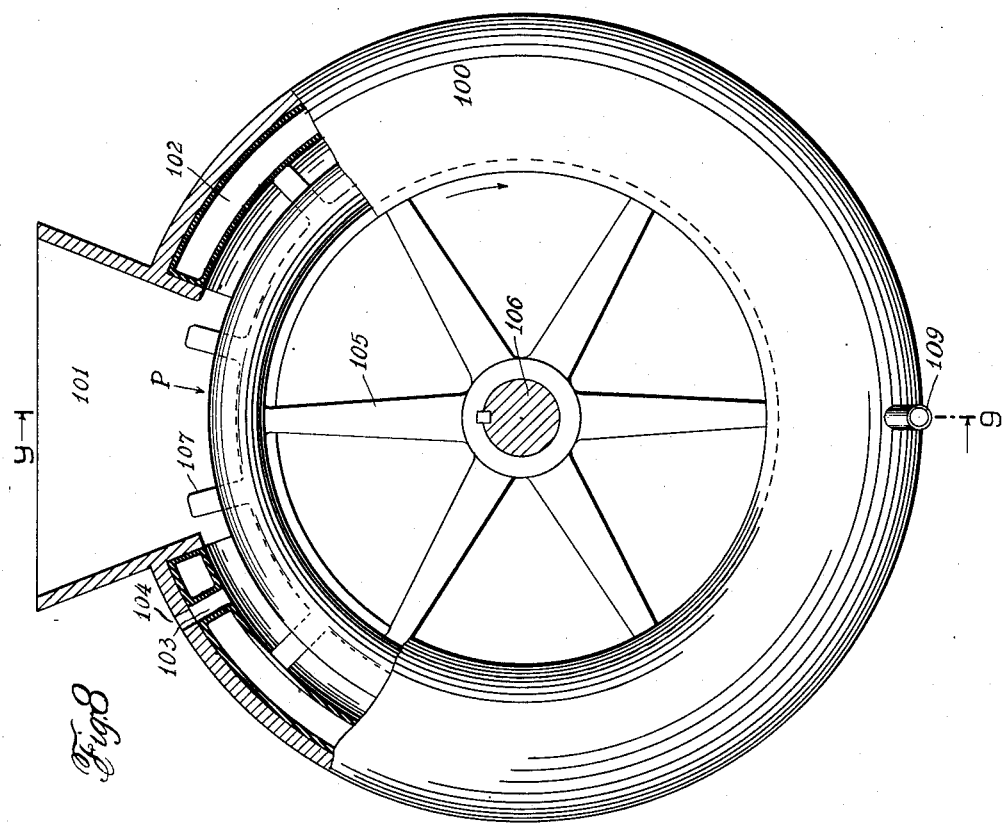

W. G. WILSON.
MACHINE FOR MOVING AND DEPOSITING CONCRETE AND OTHER PLASTIC MATERIAL.
APPLICATION FILED JULY 1, 1911.
1,048,019.
Patented Dec. 24, 1912.
5 SHEETS—SHEET 5.
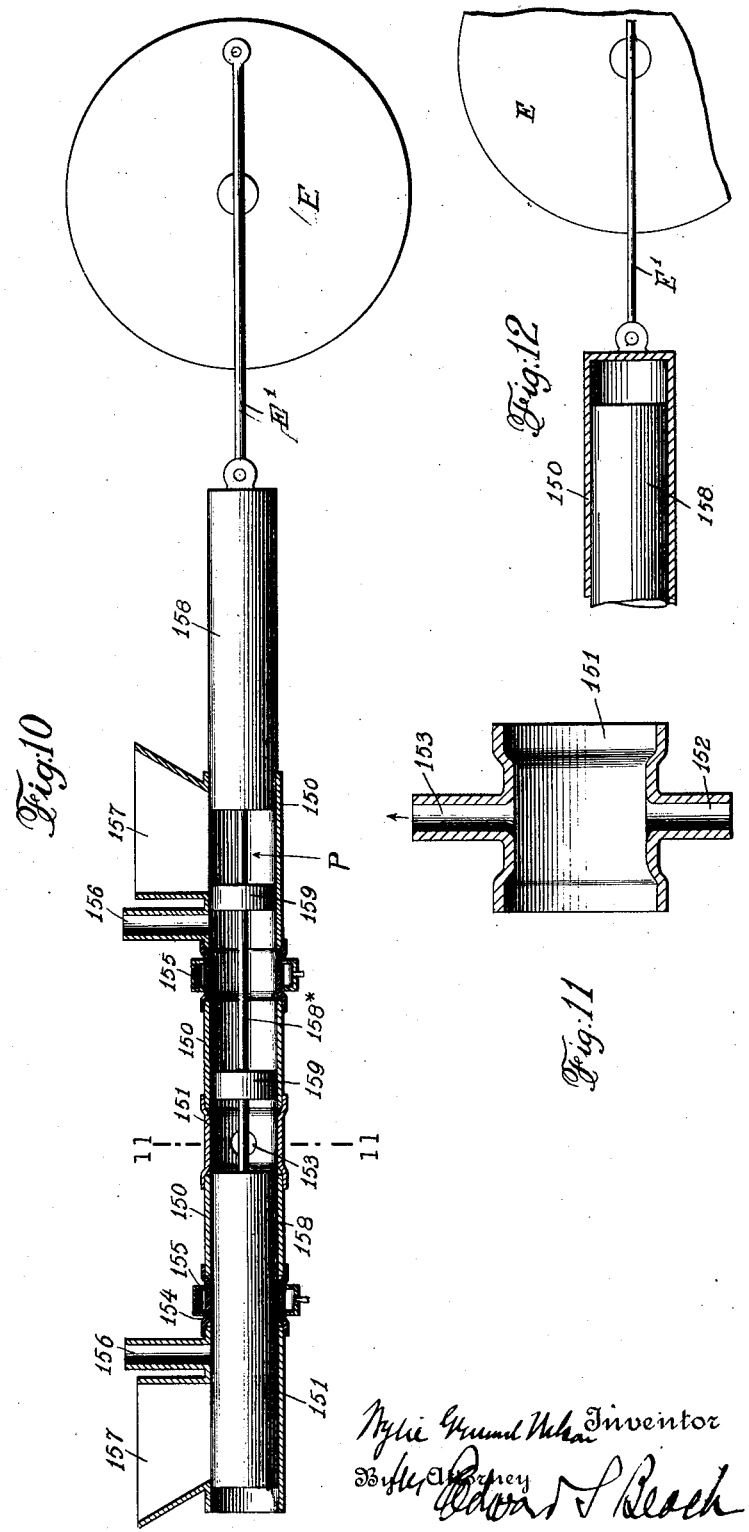

UNITED STATES PATENT OFFICE.

WYLIE GEMMEL WILSON, OF ELIZABETH, NEW JERSEY, ASSIGNOR TO W. G. WILSON COMPANY, OF MONTCLAIR, NEW JERSEY, A CORPORATION OF NEW JERSEY.

MACHINE FOR MOVING AND DEPOSITING CONCRETE AND OTHER PLASTIC MATERIAL.

1,048,019.    Specification of Letters Patent.    Patented Dec. 24, 1912.

Application filed July 1, 1911. Serial No. 636,501.

*To all whom it may concern:*

Be it known that I, WYLIE GEMMEL WILSON, a subject of the King of Great Britain, residing at Elizabeth, in the county of Union and State of New Jersey, have invented certain new and useful Improvements in Machines for Moving and Depositing Concrete and other Plastic Material, of which the following is a specification, reference being had therein to the accompanying drawings.

This invention relates to a machine for automatically transferring material from a source or sources of supply to a place or position of use, at which place or position the material, either in its initial condition or in altered condition, is under a forcibly discharging pressure.

One of several now contemplated uses of the machine is in connection with concrete or other hardenable plastic work.

In the accompanying drawings illustrating some of the many forms in which the invention may be embodied, Figure 1 is a side elevation and Fig. 2 a plan, looking down, and partially in horizontal section at line 2—2 of Fig. 1, of the machine. Fig. 3 is a vertical central section, at line 3—3 of Fig. 1, of a hopper and also of a hopper supply apparatus. Fig. 4 is a side elevation of one of the conveyer disks detached and shown fixed on the conveyer cable. Fig. 5 is an end view of what is shown in Fig. 4. Fig. 6 is a lengthwise central section of one of the air-locks with which the conveyer casing of the machine is shown provided in Fig. 1. Fig. 7 is a plan view, in which the machine is shown provided with an old and well-known form of depositing nozzle connected with a water-tank, which is here shown connected with the fluid pressure pump of the machine, which pump in this case is to be used as an air pump. Fig. 8 is a partial side elevation of a modification in which the endless conveyer, provided with a plurality of peripheral pockets, is mounted rotatably in a casing. Fig. 9 is a sectional view, at line 9—9 of Fig. 8. Fig. 10 is a lengthwise sectional view of a modification in which the conveyer casing is provided with a plurality of hoppers and the conveyer is a straight reciprocating conveyer having a plurality of pockets. Fig. 11 is a cross-section of that portion of the casing that is provided with the fluid inlet and the discharge ports, and is taken at a line corresponding to line 11—11 of Fig. 10. Fig. 12 is a diagrammatic view illustrative of the construction of the conveyer and conveyer casing illustrated in Fig. 10, but of a form that permits the casing to be reciprocated while the conveyer structure is held stationary.

In the drawings, Figs. 1 to 6, inclusive, illustrate a machine specially adapted for use in concrete or other hardenable plastic construction. Its conveyer-casing, as shown, is made up of four tubular sections 1, all united, as hereinafter described, to form a comparatively short-length, open-ended cylindrical casing, which as shown is connected with a supply hopper 2 open to atmospheric pressure and into which the aggregates of concrete may be fed from any suitable apparatus, or in which such aggregates may be shoveled manually. Preferably, hopper 2 will be supplied from a mechanical mixing apparatus of some kind. The conveyer-casing is also provided, at a point removed from the hopper connection, with an inlet port 3 for admission of a fluid under pressure, and with a discharge port 4, these two ports being located in such relation to the casing and to one another that a fluid under pressure (air, steam or water, for examples,) may flow transversely through the casing, entering it through the inlet port and escaping through the discharge port, and so forcibly discharge from the casing any material within the path of the fluid current. Preferably, the ports 3 and 4 are diametrically opposite one another, as shown. The fluid inlet port 3 is shown connected by a conduit 5 with a fluid pressure pump 6. A regulating and shut-off valve 7 is interposed between the pump and fluid inlet port 3. Discharge port 4, as shown, is provided with a discharge pipe 8, in which there may be mounted, if desired, and as shown, an entraining jet nozzle 9 opening in the direction of the discharge pipe 8, the nozzle 9 being provided with a regulating shut-off valve 10. Nozzle 9 may be connected with any suitable source of any desired fluid under head or pressure, in order that, if and when desired, the material in the casing adjacent to the discharge port may be sucked into, entrained and forced outwardly through discharge pipe 8, instead of being ejected from the casing into the discharge pipe and forced therethrough by a current forced into the casing through inlet port 3. When entrainment is desired, the valve 7 may be a two-way valve adjustable to be opened to the atmosphere and the valve 10 opened. When the entraining mode of operation is not desired in operating the machine, valve 10 may be closed and valve 7 more or less opened as desired; but manifestly, if desired, both valves 7 and 10 may be opened, more or less, to avail of the operation of pump 6 as well as the operation of the entraining jet nozzle 9. The conveyer, as shown in the particular figures referred to, which illustrate the now preferred form of the invention, is made up of an endless steel cable 11 provided at intervals with disks 12 fixed on the cable to form an endless series of material-receiving and conveying pockets P. The carrier is supported on wheels 13 and 14, and driven from one of them. In order to obtain as air-tight joints as possible, disks 12 fit snugly, but slidably, in the casing; and as the conveyer travels, the aggregates fed into the pockets P from hopper 2 are caught in successive batches in the pockets between the disks, and successively and continuously reach the position between the inlet port 3 and discharge port 4. Assuming that the valve 10 of the entraining jet nozzle 9 is closed and that the pump 6 is operating to pump air, then the solid concrete-forming aggregates in each pocket as it comes between the port 3 and the port 4 will be blown forcibly out of the pocket through the discharge port 4 and into and through the discharge pipe 8, which may be a rubber hose of any desired length. As the solid aggregates, if not already hydrated more or less, will require hydration before deposition, the entraining jet nozzle 9 may be connected with a source of water (such as a pump or reservoir, for example,); and on opening the valve 10, the solid aggregates traveling through the discharge pipe will be hydrated while in transit to the delivery end of the discharge pipe. In many cases it will be preferable to hydrate the solid aggregates during their progress through the discharge pipe by means of steam; and in such cases, nozzle 9 may be connected with any suitable source of steam supply. This nozzle 9 may also be used for injecting either water or steam,—especially steam,—into the discharge pipe and casing for the purpose of cleansing the same and preventing the deposition and hardening of concrete therein. If it is preferred that the solid aggregates shall be thoroughly mixed with water before entering hopper 2, the machine may be used for depositing such premixed aggregates. In that case, pump 6 will be used as an air pump. If it is desired to use the machine in sand-blasting operations, for example, sand may be supplied dry to hopper 2, and the pump 6, used as an air pump, will drive the sand as a sand-blast through the discharge pipe 8. In some other contemplated uses, such, for example, as spraying trees, dry soluble insecticide may be supplied to hopper 2 and the pump 6 used as a water pump, the water current in such case, forced through the inlet port 3 dissolving and forcing the solution through discharge port 4. The adaptability of this simple machine for a great variety of purposes is one of its marked advantages; and obviously any kind of fluid pressure pump 6 may be used.

The conveyer drive-wheel 13, as well as the wheel 14, are each formed with a peripheral groove, between the sides of which and on the bottom of which the disks 12 are engaged to drive the endless conveyer through conveyer casing 1. The conveyer drive-wheel 13 is fixed on a drive-shaft 15 provided with a worm gear 16 also fixed on the shaft and driven by worm 17 by any suitable motor or power-actuating device M. The driven wheel 14 is fixed on a shaft 18, preferably mounted in a slidable journal box 19 mounted in a rectangular frame 20 and connected with an adjusting screw 21 for taking up any slack in conveyer cable 11. The journal block 19 is slidable in ways 22 in opposite members of rectangular frame 20.

As already stated, the conveyer casing 1 is shown tubular, and comprising sections 1. In the construction as shown, there are four metallic pipe sections 1, two of them being coupled by couplings $x$ (Fig. 2) to the fluid-inlet and fluid-discharge pipes 5 and 8. The outer ends of these two carrier sections 1 are each coupled with an adjacent pipe section 1 (see Figs. 2 and 6) by an air-lock, which comprises a flexible pipe section 23 each opposite end of which is clamped to a pipe section 1 by any suitable fastening means 24. Each flexible pipe section 23 (conveniently of rubber,) is provided with a pair of annular, flexible projections 25 spaced apart to receive between their inner faces an annular casing 26, the side walls of which are bored to permit the passage therethrough of the flexible pipe 23. Each side of casing 26 is provided with an annular, laterally projecting threaded flange 27 which is engaged by the interiorly threaded flange of a nut 27* that encircles the pipe section and has an interior annular flange 28 which abuts against the radial flange 25 of the flexible pipe section when the nuts 27* are screwed up. In this way casing 26 is held on each flexible pipe section 23, and given an air-tight connection therewith. Casing 26 is provided with a conduit 28* through which air may be forced to constrict that portion of the flexible pipe section 23 that passes through the casing 26. One of these air-locks is located on each side of the fluid-inlet and fluid-discharge construction; and by maintaining an air pressure within the chamber of casing 26, the inner periphery thereof is pressed tightly upon the outer peripheries of the disks 12 during their movement through the conveyer casing, and thereby the outside air is prevented from interfering with the fluid current referred to and the fluid current is prevented from escaping from each pocket P, as the pockets are successively brought into the path of the fluid current, into casing 1.

While, in general concreting operations, hopper 2 will be supplied from a concrete-mixing mill, yet I show, in connection with hopper 2, a form of mixer for dry materials of different natures that is useful in some varieties of concrete or other plastic work. This mixer is also a distributer, and consists of a cone 29 fixed on a rotatable shaft 30 which passes from the apex of the cone upwardly through a hopper 31. A bearing 32 is shown for the shaft 30 of cone 29, and dry aggregates placed in hopper 31 will flow down upon the outer surface of the rotating cone 29 through the discharge end 33 of hopper 31. This discharge end 33 is of truncated conical form, and partially incloses the upper portion of cone 29, the lower end of which extends into and rotates within the upper end of hopper 2. By the rotation of cone 29, the aggregates falling upon it from hopper 31 are very conveniently distributed in a thin layer on the outer side of cone 29, and thence into the hopper 2. But, as above stated, hopper 2 may be supplied in any desired manner, manually, or from a mill or chute.

Disk 12 is preferably made of two split rubber disks, perforated to permit the passage through them of the cable 11. The split of one of the pair of disks is indicated by 12* in Fig. 4. Each pair of disk-forming members is held on the cable by an end clamp, illustrated in Figs. 4 and 5, each clamp consisting of a pair of members 34 provided with lateral ears 35 for passage of clamp-bolts 36. The members 34 on their opposite edges are adapted to be thus firmly clamped upon the cable.

When it is desired to hydrate the aggregates in a nozzle just prior to discharge, the discharge-pipe 8 may be connected with an ordinary mixing nozzle such as long used in air-brushes and analogous structures. In Fig. 7 I show a mixing nozzle N of the form shown in Millspaugh's United States Patent No. 748,791 of January 5, 1904. The operation of the conveyer and air pump will blow the aggregates through discharge-pipe 8 into the mixing nozzle N, which is shown connected by a pipe 40 to a water reservoir 41, the aqueous contents of which are kept under pressure by connection, through pipe 42 having a shut-off regulating valve 43, with air pump 6, by operation of which air may be forced simultaneously on top of the water in reservoir 41 and as a current through the present machine, simultaneously to force water and dry material into the mixing nozzle 10. Similarly, my machine may be used for applying whitewash, paint, etc., by providing it with mixing nozzles of the desired type, or any suitable air-brush.

The construction described is such that the fluid under pressure enters directly into and moves through the conveyer pockets, successively, and thence passes through the discharge port carrying the contents of the pockets, as they are successively presented to the pressure-fluid inlet and discharge ports. At the same time the air locks, at each side of the ports, prevent escape from the pockets of the fluid under pressure that passes through them. A highly important point of this construction is that the fluid under pressure clears the pockets of contained material, without permitting any of such material to escape, except through the discharge port, and the ports are so arranged with reference to the pockets that the fluid current cannot act to pack the pockets or to retard their almost instantaneous discharge.

In Fig. 8, showing another form of my invention, the drum-like casing 100 is provided with a hopper 101 having an outlet into the chamber of the drum. Except where the periphery of the drum is interrupted by the lower end of the hopper construction, the inner periphery and thereto adjacent margins are lined with an inflated rubber tube 102 that forms an air-locking bearing for the conveyer, which is supposed to be rotated in the direction of the arrow shown in Fig. 8. The inflated lining 102 has an air-vent 103 near the hopper, on that side thereof which is approached by an unfilled pocket of the conveyer. Casing 100 has an air-vent 104 in registration with air-vent 103. The conveyer is in the form of a wheel 105 fixed on a rotatable shaft 106. The rim of the wheel is transversely dished, as shown in Fig. 9, to form, with the transverse divisions 107, a series of pockets P extending peripherally around the wheel, in the rotation of which the free ends of the transverse divisions 107 contact and make a tight joint with the inner periphery of the inflated rubber bearing. The casing and bearing have a fluid pressure inlet pipe 108 passed through them for admission of fluid under pressure into and through the pocket P and thence into and out of the discharge pipe 109, which, like fluid inlet pipe 108, is passed through the casing and inflated bearing to make communication with each pocket P as, in the rotation of the conveyer, the pockets are successively brought into the path of the fluid current forced through the pockets *seriatim*, as described.

In Fig. 10, showing another modification, the conveyer casing is tubular and made up of metal sections 150 and 151, the latter having a fluid inlet port 152 and a fluid outlet port 153. The casing sections on each side of section 151 are provided with compressible glands 154 and incasing compressed air casings 155 to form air-locks for the purpose described in connection with Figs. 1 to 7. The casing is also provided with an air-vent 156 adjacent to hopper 157, and is shown provided with two air-vents and two hoppers. This casing is supposed to be stationary like the other casings hereinbefore referred to. The conveyer structure comprises a pair of piston-like plugs 158 spaced apart and held together and in line by a rod 158* on which are a pair of disks 159 of the same diameter as the piston-like plugs 158. These disks are spaced apart, and also are each spaced apart from the adjacent piston-like plug 158 to form material-receiving pockets P therein between. The plugs 158 and disks 159 are a close, substantially air-tight sliding fit within the casing. Each plug 158 is adapted to close one of the hoppers 157 and successively to uncover the lower end of the hopper for admission of material into a pocket P. By reciprocating the conveyer, each of the two pockets shown is successively brought into the section 151, when fluid under pressure forced into the inlet 152 will drive the material out of the pocket through the discharge 153. The purpose of separating the disks 159 one from another is to minimize the pressure of the pressure fluid inflow and outlet during the operation of the machine, in order that there may be practically a continuous push of the pressure fluid on the material in the discharge pipe, which in practice will be considerably prolonged. The purpose of the air-vents 156 is to permit escape from the pockets of the compressed fluid therein before the pockets come under the outlet ends of the hoppers.

It will be obvious to all mechanics that every form of the invention herein shown may be made with the casings movable instead of stationary, and with the conveyers stationary instead of movable; and in Fig. 12 I have shown such a form of reversal, the eccentric E therein shown as a power-actuating device having its rod E' attached to the conveyer casing instead of to the conveyer as in Fig. 10.

One object of this invention is to relieve the material in the hopper from the artificial pressure of the fluid current passed through the casing for ejection of the material from the casing, in order to secure a continuous feed through the hopper of material introduced into the open top thereof. If the top of the hopper be covered and airlocked, then a continuous feed through the hopper is impossible; and if, as shown, the top of the hopper be open to the atmosphere, then it is necessary, in order to secure a continuous feed, that there be no forcible current flowing in a direction opposite to the direction of the feed of the solid material. By making the hopper, if one is used, open to atmospheric pressure, so that the conveyer is supplied from a mass of material exposed to atmospheric pressure, the construction and mode of operation of the apparatus are simplified, both structurally and economically, and the full force of the pressure fluid generated or obtained can be availed of for discharging the material directly from the pockets, *seriatim*, through the outlet or discharge port or pipe of the apparatus.

I do not herein specifically claim the matter illustrated and described by Figs. 8 to 12, inclusive, as such matter forms the subject-matter of my divisional applications Serial Nos. 646,673, filed Aug. 29, 1911, and 646,674, filed Aug. 29, 1911.

I am not the first to propose the use of an entraining jet nozzle, such as 9, in apparatus of the type in question, the idea of such use having been derived by me from George Loveland Prentiss; and I do not intend herein to make any claim conflicting with his prior and generic rights, in the premises, as such rights are or may be involved in his pending applications Serial Nos. 639,204 and 639,205, each filed July 18, 1911.

What I claim is:—

1. In apparatus for moving and depositing concrete and other plastic material, the combination of a conveyer with a conveyer casing having a fluid inlet port and also a discharge port, the conveyer and its casing being movable one in relation to the other to permit a fluid entering a casing through the fluid inlet port to carry material from within the conveyer and casing structure out of the same through the discharge port; the conveyer having a sliding, substantially air-tight fit in its casing at each side of the fluid inlet and discharge ports; and the casing having other openings for entrance and exit of the conveyer and the latter being provided with a series of pockets.

2. In apparatus for moving and depositing concrete and other plastic material, the combination of a conveyer with a conveyer casing having a fluid inlet port and also a discharge port, the conveyer and its casing being movable one in relation to the other to permit a fluid entering a casing through the fluid inlet port to carry material from within the conveyer and casing structure out of the same through the discharge port;

the conveyer having a sliding, substantially air-tight fit in its casing at each side of the fluid inlet and discharge ports; and the casing having other openings for entrance and exit of the conveyer and the latter being provided with a series of pockets and the casing having a material admission opening removed from the inlet and discharge ports and also removed from the openings for entrance and exit of the conveyer.

3. In apparatus for moving and depositing concrete and other plastic material, the combination of a conveyer having a plurality of pockets; an open-ended tubular casing therefor provided between its ends with a fluid inlet port and a discharge port; and a fluid-pressure apparatus operatively connected with the fluid inlet port; the fluid inlet and discharge ports being arranged to communicate one with another through a pocket of the conveyer and the conveyer between its pockets having a sliding but substantially air-tight fit within the casing and entering and issuing through the open ends thereof.

4. In apparatus for moving and depositing concrete and other plastic material, the combination of a conveyer; a casing therefor and a fluid-pressure apparatus; the casing being ported for admission of the fluid under pressure and for discharge of the same in mixture with material brought by the conveyer into the path of the fluid current, and being also provided with an admission opening; and the conveyer being provided with an open pocket structure adapted to register with the material inlet opening and thereafter to register with the port for admission of the fluid under pressure and the port for discharge of the same in mixture with the material; and means for moving the pocket structure bodily into, through and out of the casing.

5. In apparatus for moving and depositing concrete and other plastic material, the combination of a conveyer having a plurality of pockets with an open-ended tubular casing formed between its ends with a port for admission of material and also with a fluid inlet port and a discharge port which are adapted to communicate one with another through a pocket of the conveyer; the conveyer and its casing being movable one in relation to the other to bring material moved by the conveyer into the path of a fluid current entering the fluid inlet port; and a fluid-pressure apparatus connected with the inlet port; the conveyer and casing having a sliding but substantially air-tight fit except at the pocket portion of the conveyer.

6. In apparatus for moving and depositing concrete and other plastic material, the combination of a conveyer having a plurality of pockets with an open-ended casing therefor, the casing having between its ends an inlet port and a discharge port located transversely in relation to the longitudinal axis of the casing; and means for giving the conveyer movement into, through and out of the casing; the pocket-forming walls of the conveyer having a substantially air-tight, sliding fit with the casing and closing the same at each side of the transversely arranged ports.

7. In apparatus for moving and depositing concrete and other plastic material, the combination of a conveyer having a plurality of pockets of an open-ended tubular casing therefor, the conveyer and casing being in slidable relation one to the other whereby the tubular casing forms a covering for the open sides of the pockets; and a fluid-pressure apparatus communicating with the casing and discharging into it; the casing having transversely arranged fluid inlet and discharge ports that are brought into communication one with the other successively through the conveyer pockets as they are successively brought into communication with both ports.

8. In apparatus for moving and depositing concrete and other plastic material, the combination with a conveyer having a plurality of pockets separated one from another by portions of the conveyer; of a casing provided with a fluid inlet port and with a discharge port and being also provided at each side of said ports with elastic walls; for each of said elastic walls a casing; and means for supplying said casing with a fluid under pressure to compress the elastic walls.

9. In apparatus for moving and depositing concrete and other plastic material, the combination of a conveyer provided with a pocket; a conveyer casing, provided with oppositely disposed fluid inlet and discharge ports, and the conveyer having a sliding fit in the casing; means for moving the conveyer into, through and out of the casing to bring the conveyer pocket into communication with the ports; a fluid pressure apparatus in communication with the fluid inlet port; and means for securing an elastic and substantially air-tight joint, at each side of said ports, between the pocket-forming walls of the conveyer and the casing; the latter being provided with openings for entrance and exit of the conveyer.

10. In apparatus for moving and depositing concrete and other plastic material, the combination of an open-ended conveyer casing having between its ends an inlet port for admission of a fluid under pressure and an exit port for discharge of said fluid together with material; a conveyer having a plurality of pockets adapted to be brought into registration with said inlet and exit ports successively; the conveyer and casing being movable one in relation to the other and the conveyer passing through the open ends of the casing; and means for holding material exposed to atmospheric pressure in the path of said conveyer; the pocket walls being in substantially air-tight contact with the casing at each side of said inlet and exit ports.

11. In apparatus for moving and depositing concrete and other plastic material, the combination of a conveyer casing through which a conveyer having a plurality of pockets is bodily movable in substantially air-tight contact except at its pockets with the casing; said conveyer; and means for moving the conveyer bodily into, through and out of the casing, the casing having oppositely disposed ports adapted to register with the conveyer pockets successively and the pocket-forming walls of the conveyer successively closing the casing at each side of the oppositely disposed ports.

12. In apparatus for moving and depositing concrete and other plastic material, the combination of an open-ended tubular conveyer casing having between its ends an inlet port for admission of a fluid under pressure and an exit port for discharge of said fluid material and having also between its ends a hopper open to the atmospheric pressure and discharging into said casing; an endless flexible conveyer having a plurality of pockets slidably mounted in said casing and made successively air-tight in the casing at each side of said inlet and exit ports.

13. In apparatus for moving and depositing concrete and other plastic material, the combination of an open-ended tube formed between its ends with a fluid inlet port and with a discharge port; a fluid pressure apparatus in communication with said inlet port; a discharge pipe in communication with said discharge port; a conveyer provided with a plurality of pockets and having its walls in substantially air-tight connection with the interior of the casing, and means for moving the conveyer through the casing to bring material in successive batches into the path of the fluid passing through a pocket from the fluid-pressure apparatus into the discharge pipe.

14. The combination of an open-ended conveyer casing having between its ends an inlet port for fluid under pressure and a therewith registering port for said fluid mixed with material; a conveyer provided with a plurality of pockets and movable into, through and out of the casing to bring its pockets successively into registration with said ports; and at each side of said ports an annular air-lock operating to prevent the fluid under pressure that passes through the pockets successively from escaping endwise out of the casing.

15. The combination of a conveyer provided with a plurality of disks spaced apart to form pockets; means for holding the disks at a distance one from another; an open-ended casing through which the conveyer moves, said casing being provided with a fluid inlet port and a port which registers therewith through the pockets successively, and means for making the peripheries of the pocket-forming disks air-tight with the interior of the casing at each side of said ports.

16. The combination of a tubular conveying casing; an endless, flexible conveyer; and means for moving the conveyer through the casing; the conveyer comprising disks spaced apart and having their peripheries in air-tight relation to the interior of the casing when moving through it, and the wall of the tubular casing having a port for admission of a fluid under pressure and having a therewith registering port for discharge of material, the two ports being in communication through the conveyer pockets in the successive movements of the latter through the casing.

17. The combination of an open-ended conveyer-casing; an endless, flexible conveyer; and means for moving the conveyer through the casing; the conveyer comprising disks spaced apart, and the wall of the tubular casing having an admission-port and an oppositely-disposed discharge port; the two ports being between the ends of the conveyer casing and being located to communicate through the conveyer pockets successively in the movement of the conveyer through the casing.

In testimony whereof I have affixed my signature in presence of two witnesses.

WYLIE GEMMEL WILSON.

Witnesses:
 FRANCES E. NARES,
 LILLIE VREELAND.